United States Patent
Bernhard et al.

(10) Patent No.: US 8,089,237 B2
(45) Date of Patent: Jan. 3, 2012

(54) METHOD FOR CONTROLLING AN OPENING LEAF OF A VEHICLE WITH AN ANTI-TRAP FUNCTION

(75) Inventors: Eric Bernhard, Guyancourt (FR); Hoang-Giang Nguyen, Ris Orangis (FR); Laurent Piloy, Voisins le Bretonneaux (FR)

(73) Assignee: Renault S.A.S., Boulogne-Billancourt (FR)

( * ) Notice: Subject to any disclaimer, the term of this patent is extended or adjusted under 35 U.S.C. 154(b) by 577 days.

(21) Appl. No.: 12/097,007

(22) PCT Filed: Nov. 20, 2006

(86) PCT No.: PCT/FR2006/051192
§ 371 (c)(1),
(2), (4) Date: Oct. 10, 2008

(87) PCT Pub. No.: WO2007/077369
PCT Pub. Date: Jul. 12, 2007

(65) Prior Publication Data
US 2009/0284203 A1    Nov. 19, 2009

(30) Foreign Application Priority Data
Dec. 23, 2005    (FR) ..................... 05 13246

(51) Int. Cl.
*H02H 7/085* (2006.01)

(52) U.S. Cl. ........ 318/476; 318/469; 318/466; 318/281; 49/26; 49/28; 49/29; 324/171; 324/172; 702/105; 702/115; 702/116

(58) Field of Classification Search ........ 318/476, 318/469, 466, 281; 49/26, 28, 29; 324/171, 324/172; 702/105, 115, 116
See application file for complete search history.

(56) References Cited

U.S. PATENT DOCUMENTS

| | | | |
|---|---|---|---|
| 4,625,291 A | 11/1986 | Hormann | |
| 5,483,135 A | 1/1996 | Parks | |
| 5,539,290 A * | 7/1996 | Lu et al. | 318/565 |
| 6,137,404 A * | 10/2000 | O'Connor | 340/541 |
| 7,346,272 B2 * | 3/2008 | Franzan | 388/800 |
| 7,359,783 B2 * | 4/2008 | Vives et al. | 701/49 |

FOREIGN PATENT DOCUMENTS
EP    1580861    9/2005
* cited by examiner

*Primary Examiner* — Walter Benson
*Assistant Examiner* — David S Luo
(74) *Attorney, Agent, or Firm* — Oblon, Spivak, McClelland, Maier & Neustadt, L.L.P.

(57) ABSTRACT

A method for controlling an opening leaf of a vehicle. The method detects whether a predetermined event is occurring in the absence of a predetermined situation likenable to a trapping incident and, if appropriate, lowers a function of detecting the situation likenable to a trapping incident.

12 Claims, 3 Drawing Sheets

METHOD FOR CONTROLLING AN OPENING LEAF OF A VEHICLE WITH AN ANTI-TRAP FUNCTION

The invention relates to the opening leaves of motor vehicles and in particular to the anti-trap protection function associated therewith.

The anti-trap protection is activated during the occurrence of an excessive force during the closure of the movable panel of the opening leaf. It is thus possible to protect, if appropriate, a finger, an arm or a neck of an occupant of the vehicle which is situated in the opening to be closed.

However, the excessive force can also be generated by the deformation of the opening leaf mechanism. This involves, for example, rails of the movable panel, sliding-door rails, twisting of the bodyshell, etc. Such a deformation may be permanent or at least last for a prolonged period. Consequently, since the electronic control unit continues to detect a situation equivalent to a trapping instant, it refuses to close the opening leaf, a situation which may prove detrimental particularly in the event of bad weather.

There is often a procedure for forcing the anti-trap facility and for implementing a new learning process which proceeds, for example, as follows. When the anti-trap function is triggered in an untimely manner because of a mechanical fault, it is possible to manually disable the anti-trap facility by placing the control button in the closure position and by carrying out the following operations:

phase 1: advancing the opening leaf in the step-by-step mode until achieving complete closure;

phase 2: initializing the computer belonging to the opening leaf; the latter starts from a mechanical stop position then returns to a software stop position until the end of the initialization;

phase 3: carrying out a process of manually learning the anti-trap function. For this purpose, a complete cycle of opening and then closing the opening leaf is carried out so that the computer can learn the new force detection law.

Given that the user is generally unaware of the procedure for disabling the anti-trap function, he is obliged to make a journey to an after-sales service center so that this disabling operation can take place and, if appropriate, so that the anti-trap function of the control computer can be reinitialized and relearnt. However, it is preferable to be able to avoid this journey to the after-sales service center.

One object of the invention is to improve the anti-trap function of vehicle opening leaves.

Accordingly, a method for controlling an opening leaf of a vehicle is provided according to the invention in which:

it is detected whether a predetermined event occurs in the absence of a predetermined situation equivalent to a trapping instant; and if appropriate, a process of learning a function for detecting the situation equivalent to a trapping instant is carried out.

Thus, the learning process takes place before the situation equivalent to the trapping instant arises. The data relating to the learning function are therefore updated in order to better prevent the untimely triggering of the anti-trap facility.

The method according to the invention may additionally incorporate at least any one of the following features:

the detection and/or the learning process are carried out by automated means;

the event concerns a kilometrage of the vehicle, and preferably comprises the fact that a difference between an instantaneous kilometrage of the vehicle and a kilometrage of the vehicle during the last learning process exceeds a predetermined threshold;

the event comprises the fact that an operating parameter of the opening leaf exceeds a predetermined threshold, the parameter being, for example, a current intensity associated with a force generated to move the opening leaf, in particular to close it, or a variation in the speed of movement of the opening leaf;

the detection is carried out during the command by an occupant of the vehicle to move the opening leaf, in particular to close it;

the learning process is carried out during this movement;

the detection is carried out during a movement of the opening leaf, in particular its closure, commanded by an occupant of the vehicle;

the learning process is carried out during a subsequent movement of the opening leaf, in particular the following movement, commanded by an occupant of the vehicle;

it is detected whether the movement of the opening leaf during the learning process is complete. If yes, results of the learning process are stored in memory; if no, the results of the previous learning process are retained and a new learning process is carried out during a subsequent movement of the opening leaf; and results of the learning process are stored in memory with information relating to a kilometrage of the vehicle, in particular in the course of acquiring these results.

Provision is also made according to the invention for a device for controlling an opening leaf of a vehicle that is designed to carry out a process of learning a function for detecting a situation equivalent to a trapping instant, the device being designed to determine whether a predetermined event occurs in the absence of the situation equivalent to a trapping instant, and, if appropriate, to carry out the learning process.

Other features and advantages of the invention will become apparent from the following description of two preferred embodiments given by way of nonlimiting examples with reference to the appended drawings in which.

The invention applies to any type of opening leaf in a motor vehicle, such as a side door, a rear door, a window lifter, a hood with electric opening, an electric or electrohydraulic trunk door, an opening roof, etc.

Figure 1:
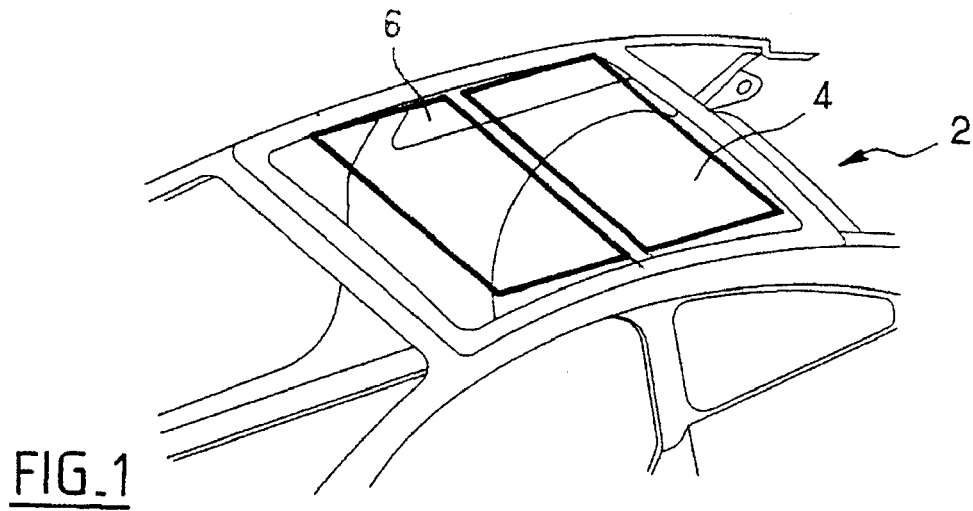
FIGS. 1 and 2 are perspective views of an upper part of a vehicle showing examples of an opening leaf to which the invention applies.

FIG. 1 illustrates a vehicle in which the invention applies to an electric opening roof 2 comprising a fixed roof part 4 and a movable roof part 6. The two parts have a rectangular shape, the fixed roof part 4 extending at the rear while the movable roof part 6 extends at the front. The latter can be moved by sliding from front to rear in a direction parallel to the direction of travel of the vehicle. For this purpose, there is provided a motor 8 and an electronic computer 10 which serves to control the motor. The part 6 will, for example, be slidably mounted in side rails (not shown) which will serve to guide its movement from its most advanced position to its most retreated position. This sliding movement of the movable roof part 6 can take place either above or below the fixed roof part. The movable roof part 6 here slides between the fixed roof part and the interior roof liner. One or more control buttons for the opening roof are provided inside the passenger compartment of the vehicle so that the roof can be controlled by one of the occupants.

Figure 2:
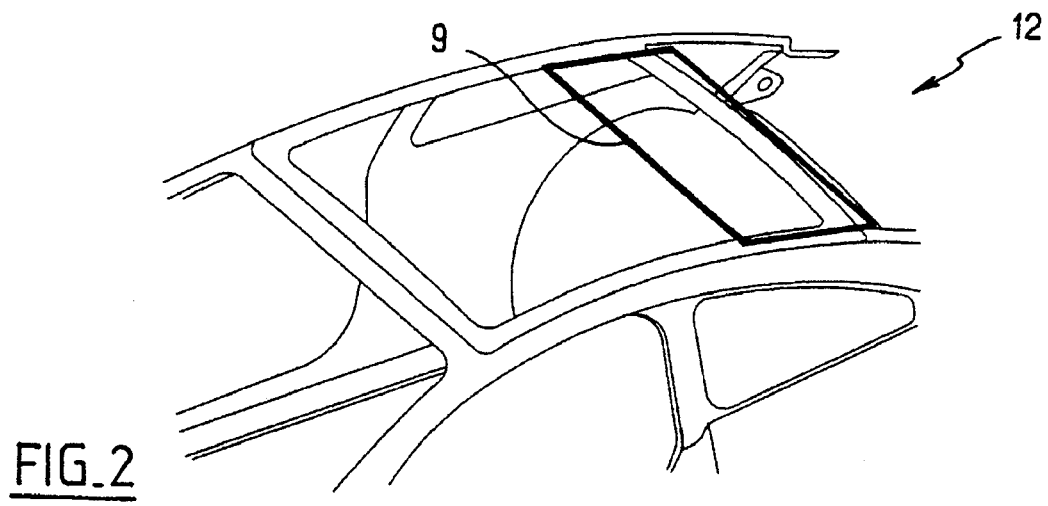
Figure 3:
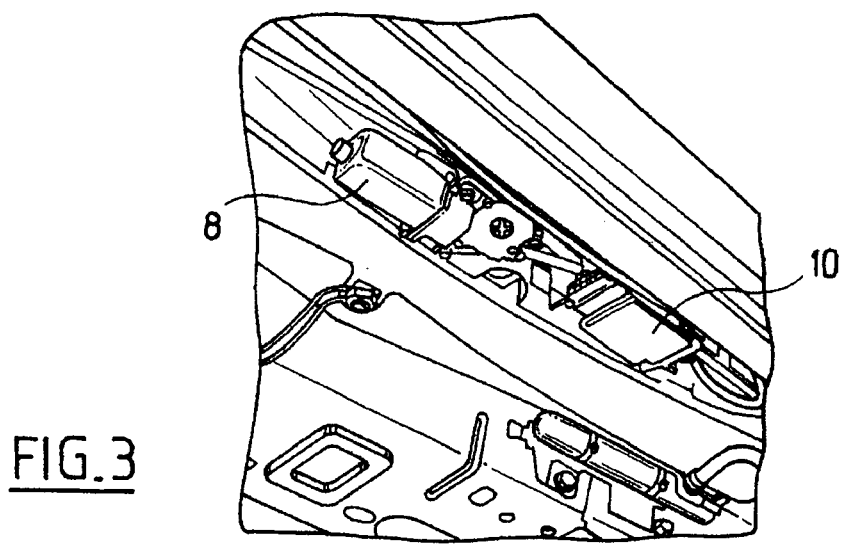
FIG. 3 is a perspective view of an internal part of the vehicle in FIG. 1 showing the motor and the electronic control unit associated with the opening leaf.

The invention also applies, for example, to a vehicle, such as the vehicle 12 illustrated in FIG. 2, comprising a completely fixed glass roof provided with a movable sunscreen 9. The sunscreen can, for example, deploy from the rear to the front from a wound configuration around a shaft extending transversely to the direction of travel of the vehicle. The front ends of the roller are here also guided during their movement in side rails. Here too, a motor drive and an electronic control unit make it possible to move the sunscreen and to control its movement.

The electronic control unit 10 will be provided with conventional electronic components such as memory, microprocessor, etc., for providing, inter alia, the functionalities which will now be described.

Figure 4:
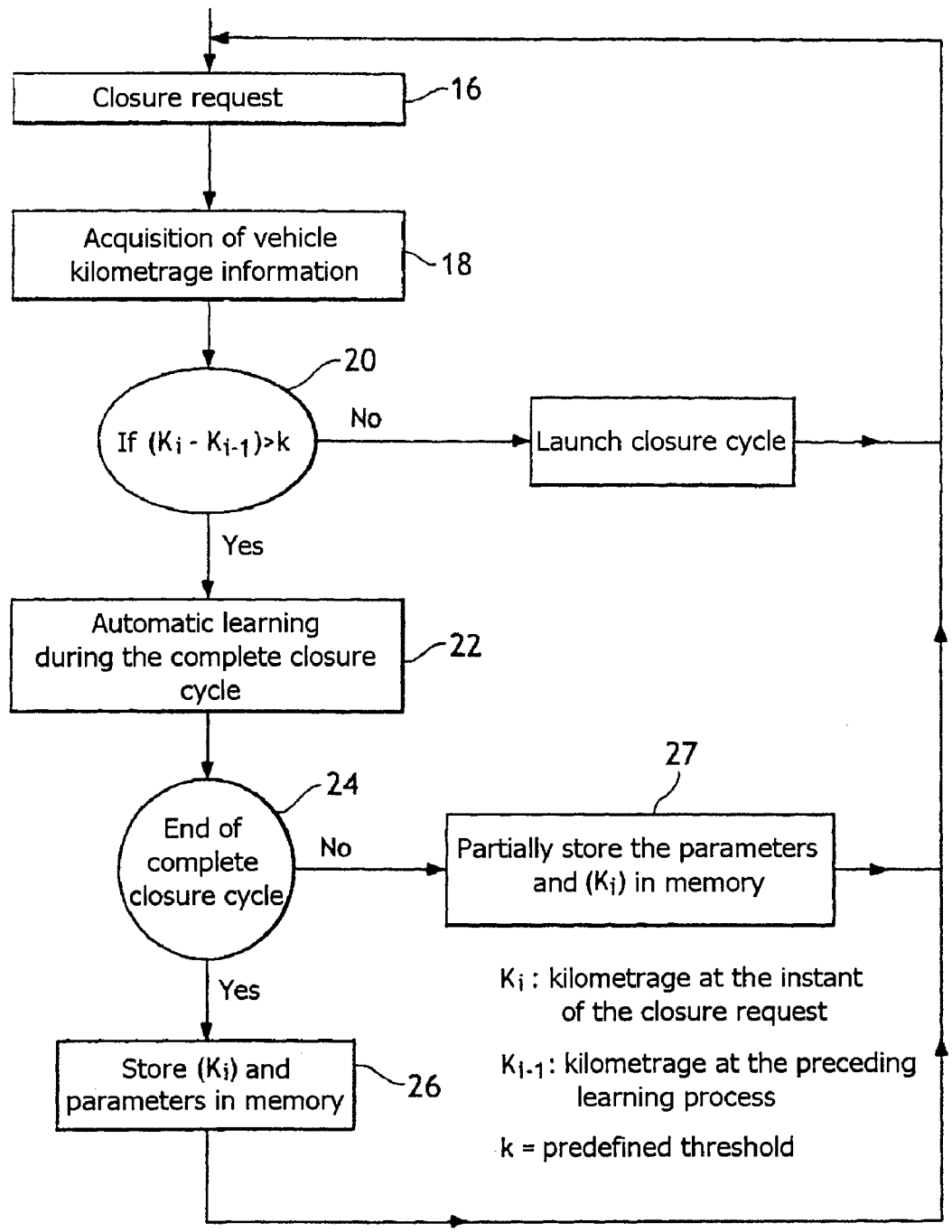
FIGS. 4 and 5 are two flowcharts illustrating the progression of the method of the invention in the two embodiments.

A first embodiment of the method of the invention has been illustrated in the flowchart shown in FIG. 4. The computer 10 is here designed to automatically carry out a complete learning cycle per frequency of a predetermined number of thousands of kilometers covered by the vehicle. For example, it will carry out the cycle every 5000 km.

For this purpose, the computer 10 detects that an occupant of the vehicle commands a complete closure cycle of the opening leaf in step 16.

In the following step 18, the computer obtains the value $K_i$ of the current kilometrage of the vehicle. A suitable connection will be provided for this purpose between the computer and the speedometer of the vehicle or a component connected to the latter.

In the following step 20, the computer compares the current value $K_i$ of the kilometrage with the value $K_{i-1}$, stored in memory, of the kilometrage during the preceding learning process. If the difference between these two values is greater than a predetermined threshold k, for example 5000 km here, the computer launches the automatic learning cycle during the complete closure cycle of the opening leaf. This is the step referenced 22 in FIG. 4.

The learning process will consist, for example, in recording the intensity of the forces delivered by the motor to close the opening leaf along its travel between the open position and the closed position and in determining, in a manner known per se, one or more threshold values or else a curve of threshold values as a function of the movement, above which values the intensity of the force delivered will be considered equivalent to a trapping situation. This force intensity will be recorded, for example, in the form of an intensity of current flowing through the motor. In a variant, provision may be made for the learning process to consist in recording the variation in the speed of movement of the movable roof.

The learning step 22, like the detection step, takes place automatically by the computer. Both steps are executed in a manner which is transparent to the driver, who only perceives the closure of the opening leaf following his command.

If, during a subsequent step 24, the computer detects that this movement of the opening leaf is interrupted before complete closure, it interrupts the learning process and keeps in memory only the results of that part of the learning process already carried out. During a step 27, it returns to the configuration which preceded the step 16. It follows that the automatic learning process will be executed at the next request for complete closure. The computer retains in memory the nonupdated learning parameters which were its parameters before the new learning process was ordered. In a variant, provision may be made for the step 27 not to exist such that, if the learning process is interrupted, the results of the partial learning process are not stored in memory.

If, conversely, the closure movement takes place until the closed position is obtained, the learning process is complete, and in the following step 26 the computer replaces the parameters associated with the preceding learning process with the parameters associated with the new learning process which has been carried out, recording all these parameters with the kilometrage information of the vehicle.

During a next movement of the opening leaf to close it, it is this new learning process which will be taken into account by the anti-trap protection function.

Furthermore, at the end of the step 26, the computer returns to the configuration preceding the step 16.

Figure 5:
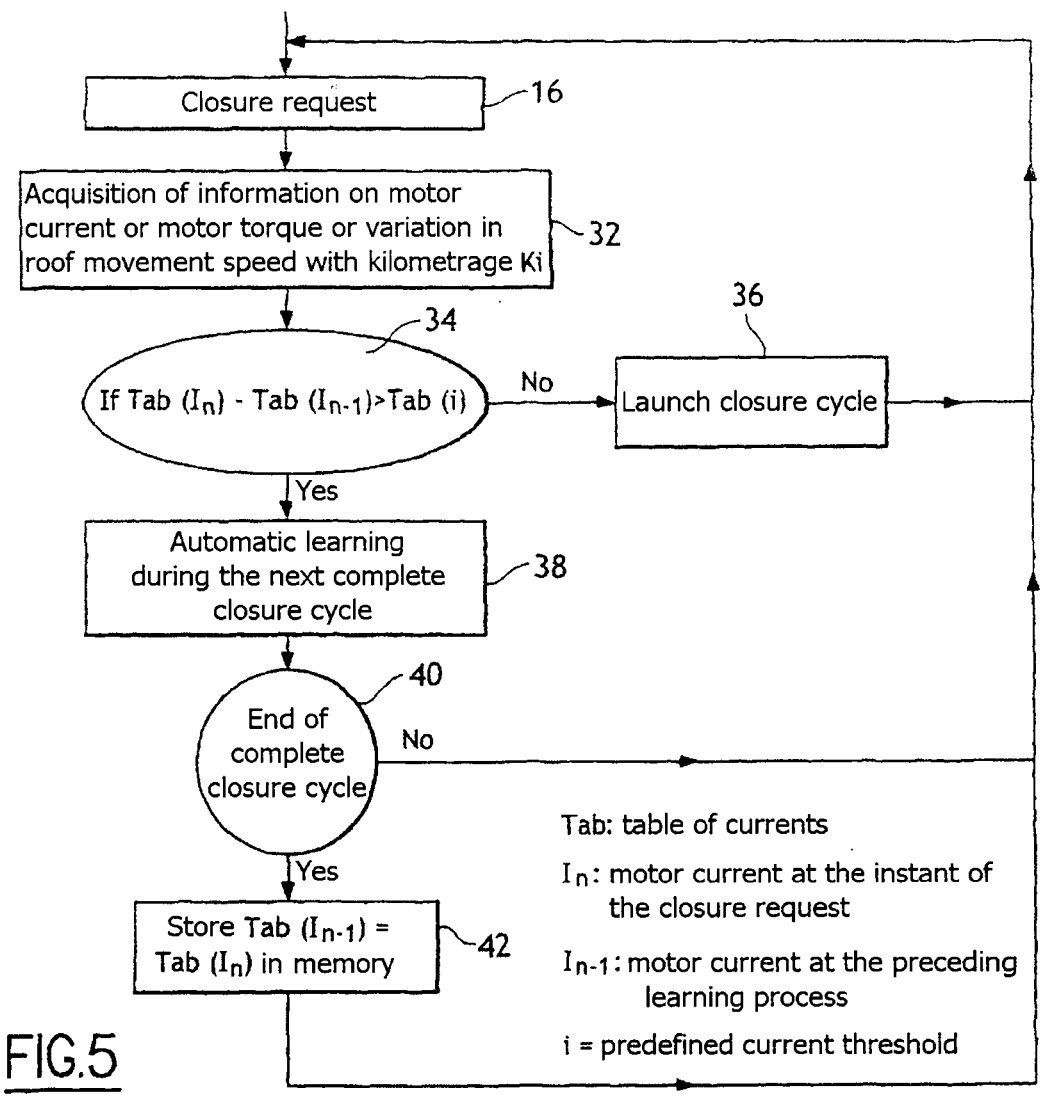
Figure 6:
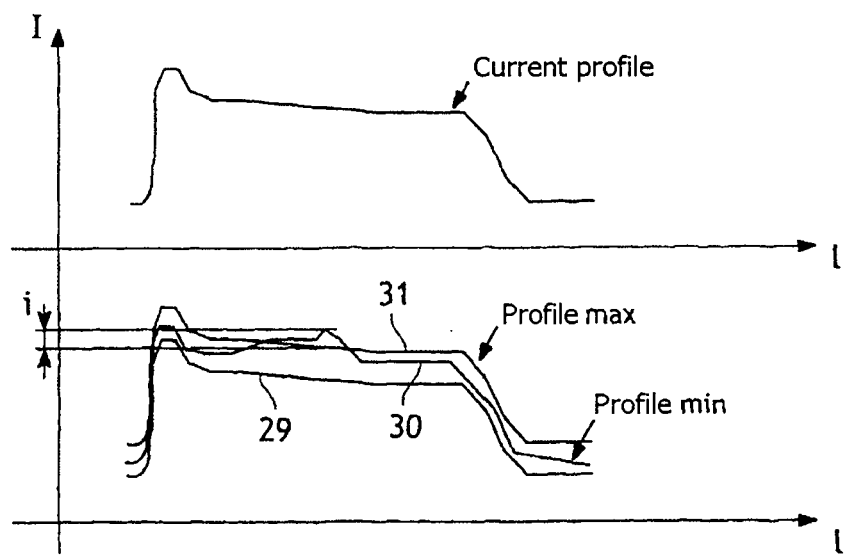
FIG. 6 shows curves relating to the method forming the subject of FIG. 5.

Another embodiment of the method of the invention has been illustrated in FIG. 5. In the course of this embodiment, account is taken of an operating parameter of the motor such as the amplitude of the torque delivered by the latter to move the opening leaf from its open position to its closed position. This thus involves following the change in the intensity i of the current flowing through the motor along the curve I, with a kilometrage $K_i$, illustrated in FIG. 6. The curve in the upper part of the figure is the general profile of the change in intensity, this profile being used in the lower part of FIG. 6 to form, by means of constant spacings, a maximum profile 31 and a minimum profile 29 between which must be situated the curve 30 showing the instantaneous actual change in intensity of the motor. The maximum profile curve 31 is stored in the computer in the form of a table.

In this embodiment, a closure request is again detected in step 16, which triggers the acquisition of information relating to the change in current of the motor during the movement of the opening leaf in order to close it, in step 32.

In another variant, account is taken of the current or the variation in the speed of movement of the movable part of the roof.

In step 34, the computer permanently makes a comparison between the actual value of the current of the motor and the value corresponding to the maximum profile 31 at the same point on the trajectory. If the difference does not exceed a predetermined threshold i, the computer allows the closure cycle to continue and to finish normally in step 36 without providing a learning step.

If, conversely, the threshold i is exceeded at a point on the curve, the computer makes provision in step 38 to launch an automatic learning process on the occasion of the next complete closure cycle.

The computer then monitors the triggering of a command to close the opening leaf by an occupant of the vehicle. This command can occur at a certain time, for example a number of hours or a number of days, after the closure movement during which the computer detected the need for a learning process.

The computer carries out the learning process in question during this new closure movement of the opening leaf. This learning process takes place, for example, as in the first embodiment without step 27.

During this movement, the computer detects whether the movement is interrupted before complete closure in step 40. If complete closure is thus not achieved, the learning process is interrupted and the computer returns to the configuration prior to step 16 so as to be able to carry out this learning process during the next closure movement. If, conversely, the closure movement is complete, the computer stores in memory, in step 42, the new parameters resulting from the learning process and replaces the preceding parameters with these new parameters which it records. Thus, the current curve after the automatic learning process has been successfully completed is used as a curve in nominal mode until the next automatic learning step and serves to construct a new profile 31 of maximum values.

The computer then returns to the configuration prior to step 16.

In another embodiment of the method, the two embodiments illustrated in FIGS. 4 and 5 may be combined. This will involve, for example, configuring the computer to detect the occurrence of either one of the events consisting of the exceeding of a kilometrage threshold since the last learning process and the exceeding of a current threshold as presented with reference to FIG. 5. The first of the events which occurs is the one which will trigger the programming of a learning cycle.

It will be observed that, in the case of FIG. 4, the learning process takes place during the closure movement triggered by the closure request of step 16, while in FIG. 5 it takes place during the closure movement following the one during which the need for a learning process was detected.

Of course, many modifications may be made to the invention without departing from the scope thereof.

The invention claimed is:

1. A method for controlling an opening leaf of a vehicle, comprising:
   detecting a difference between an instantaneous kilometrage of the vehicle and a kilometrage of the vehicle during a last process of learning a force required to close the opening leaf of the vehicle; and
   carrying out, when the difference exceeds a predetermined threshold, a process of learning an updated force required to close the opening leaf of the vehicle.

2. The method according to claim 1, wherein the detecting and the carrying out are performed by an automated mechanism.

3. A method for controlling an opening leaf of a vehicle, comprising:
   comparing an operating parameter of the opening leaf with a predetermined threshold; and
   carrying out, when the operating parameter exceeds the predetermined threshold, a process of learning an updated force required to close the opening leaf of the vehicle.

4. The method according to claim 3, wherein the operating parameter is a current intensity associated with a force generated to move the opening leaf.

5. The method according to claim 3, wherein the operating parameter is a variety in speed of movement of the opening leaf.

6. The method according to claim 1, wherein the detecting is carried out during a command by an occupant of the vehicle to move the opening leaf.

7. The method according to claim 6, wherein the learning process is carried out during movement of the opening leaf.

8. The method according to claim 1, wherein the detecting is carried out during a closure movement of the opening leaf commanded by an occupant of the vehicle.

9. The method according to claim 8, wherein the learning process is carried out during a subsequent movement of the opening leaf following the closure movement commanded by the occupant of the vehicle.

10. The method according to claim 1, further comprising:
    detecting whether a movement of the opening leaf during the learning process is complete;
    if the learning process is complete, storing results of the learning process in memory; and
    if the learning process is not complete, retaining results of the previous learning process and carrying out a new learning process during a subsequent movement of the opening leaf.

11. The method according to claim 1, wherein results of the learning process are stored in memory with information relating to a kilometrage of the vehicle when the results are acquired.

12. A device for controlling an opening leaf of a vehicle, comprising:
    a motor to open and close the opening leaf; and
    a computer configured to detect a difference between an instantaneous kilometrage of the vehicle and a kilometrage of the vehicle during a last process of learning a force required for the motor to close the opening leaf of the vehicle and to carry out, when the difference exceeds a predetermined threshold, a process of learning an updated force required for the motor to close the opening leaf of the vehicle.

* * * * *